United States Patent
Fender et al.

(10) Patent No.: US 11,314,736 B2
(45) Date of Patent: Apr. 26, 2022

(54) GROUP-BY EFFICIENCY THOUGH FUNCTIONAL DEPENDENCIES AND NON-BLOCKING AGGREGATION FUNCTIONS

(71) Applicant: Oracle International Corporation, Redwood Shores, CA (US)

(72) Inventors: Pit Fender, Union City, CA (US); Benjamin Schlegel, Merced, CA (US); Matthias Brantner, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 280 days.

(21) Appl. No.: 16/744,635

(22) Filed: Jan. 16, 2020

(65) Prior Publication Data
US 2021/0224257 A1  Jul. 22, 2021

(51) Int. Cl.
*G06F 16/242* (2019.01)
*G06F 16/2458* (2019.01)
*G06F 16/2453* (2019.01)
*G06F 16/22* (2019.01)

(52) U.S. Cl.
CPC .......... *G06F 16/244* (2019.01); *G06F 16/221* (2019.01); *G06F 16/2458* (2019.01); *G06F 16/24534* (2019.01)

(58) Field of Classification Search
CPC ................. G06F 16/244; G06F 16/221; G06F 16/24534; G06F 16/2458
See application file for complete search history.

(56) References Cited

U.S. PATENT DOCUMENTS

| | | |
|---|---|---|
| 5,440,735 A | 8/1995 | Goldring |
| 6,370,524 B1 | 4/2002 | Witkowski |
| 6,449,606 B1 | 9/2002 | Witkowski |
| 6,496,819 B1 | 12/2002 | Bello |
| 6,643,636 B1 | 11/2003 | Au |
| 6,775,662 B1 * | 8/2004 | Witkowski ........ G06F 16/24537 |
| 6,954,758 B1 | 10/2005 | O'Flaherty |
| 8,521,723 B1 | 8/2013 | Ahmed |
| 10,901,948 B2 | 1/2021 | Ackerman et al. |
| 2002/0174111 A1 | 11/2002 | Kougiouris |
| 2004/0122814 A1 * | 6/2004 | Zhang ............... G06F 16/24556 |

(Continued)

OTHER PUBLICATIONS

Hutmacher, Daniel. "Blocking/non-blocking aggregate operators", Jun. 15, 2014, Structured Concepts. (Year: 2014).*
Grimes, Shane. "SQL Order by with aggregation", Sep. 8, 2015, Adatis. (Year: 2015).*
TPC Benchmark H, (Decision Support) Standard Specification Revision 2.17.1, Copyright 1993—2014 Transaction Processing Performance Council, 136 pages.

(Continued)

*Primary Examiner* — David T. Brooks
*Assistant Examiner* — Lana Alagic
(74) *Attorney, Agent, or Firm* — Hickman Becker Bingham Ledesma LLP (57) ABSTRACT

Techniques described herein proposes a Dependent Grouping Column Rewrite that simplifies a grouping operation by excluding dependent grouping columns from a group by clause. A non-blocking aggregation function is applied to dependent grouping columns in at least select clauses. Such a simplified grouping operation reduces memory pressure, speeds up grouping operations, and saves compute time, as grouping columns that have no additional effect on the grouping operation are excluded from processing (e.g., hashing and key matching).

18 Claims, 5 Drawing Sheets

400

402
Determining a set of dependent grouping columns for a GROUP BY operator

404
Transforming each dependent grouping column into an aggregation column by applying a non-blocking aggregation function

(56) References Cited

U.S. PATENT DOCUMENTS

| | | |
|---|---|---|
| 2007/0050367 A1 | 3/2007 | Suganuma |
| 2009/0254513 A1 | 10/2009 | Luukkala et al. |
| 2010/0030748 A1 | 2/2010 | Netz |
| 2010/0049730 A1 | 2/2010 | Qiao et al. |
| 2011/0131199 A1* | 6/2011 | Simon ............... G06F 16/24542 707/714 |
| 2011/0153593 A1* | 6/2011 | Zhou ................. G06F 16/24537 707/718 |
| 2011/0161387 A1 | 6/2011 | Krueger |
| 2013/0103701 A1 | 4/2013 | Vishnubhatta |
| 2014/0317087 A1 | 10/2014 | Collins |
| 2015/0074407 A1 | 3/2015 | Palmeri |
| 2015/0261882 A1 | 9/2015 | Roberts |
| 2016/0241577 A1 | 8/2016 | Johnson et al. |
| 2017/0242876 A1 | 8/2017 | Dubost |
| 2018/0211143 A1 | 7/2018 | Haruta |
| 2018/0218020 A1 | 8/2018 | Dutta |
| 2019/0251194 A1 | 8/2019 | Fender |
| 2021/0165778 A1 | 6/2021 | Fender |

OTHER PUBLICATIONS

M. Eich et al., "Faster Plan Generation through Consideration of Functional Dependencies and Keys", PVLDB, vol. 9, dated 2016, 12 pages.

Boncz et al., "TPC-H Analyzed: Hidden Messages and Lessons Learned from an Inuential Benchmar", dated 2013, 16 pages.

Bellamkonda et al., ". Enhanced Subquery Optimizations in Oracle", PVLDB, 2(2):13661377, dated 2009, 12 pages.

Fender et al., U.S. Appl. No. 15/897,375, filed Feb. 15, 2018, Supplemental Notice of Allowability, dated Aug. 19, 2021.

Fender, U.S. Appl. No. 15/897,375, filed Feb. 15, 2018, Final Office Action, dated Jul. 24, 2020.

Fender et al., U.S. Appl. No. 15/897,375, filed Feb. 15, 2018, Notice of Allowance dated May 14, 2021.

Fender, U.S. Appl. No. 15/897,375, filed Feb. 15, 2018, Office Action, dated Jan. 17, 2020.

Fender, U.S. Appl. No. 16/699,524, filed Nov. 29, 2019, Office Action, dated Aug. 10, 2021.

Fender, U.S. Appl. No. 15/897,375, filed Feb. 15, 2018, Office Action, dated Jan. 1, 2021.

* cited by examiner

402 Determining a set of dependent grouping columns for a GROUP BY operator

404 Transforming each dependent grouping column into an aggregation column by applying a non-blocking aggregation function

502 Receiving a particular query

504 Determining whether one or more rewrite criteria are satisfied

506 In response to determining that one or more rewrite criteria are satisfied, generating a rewritten query

GROUP-BY EFFICIENCY THOUGH FUNCTIONAL DEPENDENCIES AND NON-BLOCKING AGGREGATION FUNCTIONS

CROSS-REFERENCE TO RELATED APPLICATIONS

This application is related to U.S. patent application Ser. No. 15/897,375, filed Feb. 15, 2018, entitled "Code Dictionary Generation on Non-Blocking Operations," and U.S. patent application Ser. No. 16/699,524, filed Nov. 29, 2019, entitled "ROWID Elimination Rewrite," wherein the entire contents of which are hereby incorporated by reference as if fully set forth herein.

FIELD OF THE INVENTION

The present disclosure relates to the field of database systems, and in particular to rewrite techniques. For instance, the disclosed rewrite techniques transform grouping columns into aggregation columns by making use of non-blocking aggregation functions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A goal of query optimization is to reduce system resources required to fulfill a query and to, thus, return a result set faster. A query can be executed through different algorithms or can be rewritten in different forms and structures. A query optimizer considers possible query execution plans (QEPs) to determine the most efficient way to execute the query.

Query processing is the process of translating a query expressed in a high-level language, such as SQL, into a low-level data manipulations operations in which a database management system (DBMS) can easily work with.

Hashing is a relevant operation within query processing. Many core database operators, such as a GROUP BY operator, rely on hash implementations. The GROUP BY operator applies a hashing function to values of grouping columns to be able to put rows within the same group by column keys into the same hash bucket. Compute cost of the grouping operation depends on how many times the hashing function is invoked. The more GROUP BY columns that are referenced in the operator, the greater the compute cost. However, in some instances, some of the GROUP BY columns do not have any effect on the operator. Inclusion of such GROUP BY columns leads to performance inefficiency.

Therefore, there is a need for rewrite or transformation techniques that simplify and speed up grouping operations to improve query processing.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A Dependent Grouping Column Rewrite technique described herein transforms grouping columns into aggregation columns by making use of a non-blocking but a deterministic aggregation function. By transforming grouping columns into aggregation columns, the grouping operation associated with the those columns is simplified since less columns need to be included in hash key computations, which decreases the likelihood of hash collisions and speeds up key matching. The Dependent Grouping Column Rewrite technique speeds up grouping operations without modifying or altering an already complex GROUP BY operator.

For the TPC-H Benchmark, the Dependent Grouping Column Rewrite technique is applicable for five (5) queries out of 23.

Query Optimization Overview

In query optimization, a query rewrite technique may rewrite a representation of a query from one form to another form as long as the two forms are semantically equivalent to each other. The representation of the query may be the query expression or code itself or may be an internally and/or externally recognized representation of the query, such as a query execution tree or other data structure. If the representation does not include the query expression itself, the representation may include data that describes processes that may be performed to execute the query, such as a query execution plan (QEP). A QEP is a set of directives and metadata that is prepared for an execution engine.

As used herein, a query representation is "rewritten" when the representation represents a rewritten version of the query, after the query has been rewritten from a first version to a second version. A first version may be an original query or may be another version rewritten from the original query. Two query representations are semantically equivalent to each other when the two query representations, if executed, would produce equivalent result sets, even if the result sets are assembled in different manners by the two query representations.

Functional Dependencies

Functional dependencies are an important property in a database. Within a relational database, a functional dependency (FD) exists between two attributes A and B in a relation if for every value of A in a tuple of the relation, the same value of B exists in the tuple. In other words, within a relation, B is functionally dependent on A if for every value in A for which there is an instance in a tuple, the same value of B exists in the tuple. The notation of A functionally determines B is A→B. The right-side, which is also referred to as the body, of the FD has a set of one or more attributes, and the left-side, which is also referred to as the head, of the FD has a set of one or more attributes. The attributes on the right side are dependent on the combination of attributes on the left-side of the FD.

Inter-Dependencies Between Referenced Grouping Columns in TPC-H Benchmark Queries TPC is a non-profit corporation founded to define transaction processing and database benchmarks and has developed and published specifications including decision support benchmarks, such as TPC-H. There are five (5) out of 23 TPC-H Benchmark queries that exhibit or have a functional dependency relationship between at least one grouping (e.g., GROUP BY) column and the rest of the grouping columns of the same base table.

The five (5) TPC-H benchmark queries are TPC-H query 3 (Q3), TPC-H query 10 (Q10), TPC-H query 18 (Q18), a ROWID Elimination Rewrite version of TPC-H query 20 (Q20), and a ROWID Elimination Rewrite version of TPC-H query 21 (Q21), which are shown in Tables 1-5, respectively. Original version of TPC-H Q20 and TPC-H Q21 are shown in Tables 6 and 7, respectively.

TABLE 1

TPC-H Q3

```
SELECT   /*Q3*/
  FROM (
  SELECT l_orderkey,
         sum (l_extendedprice * (1 − l_discount)) as revenue,
         o_orderdate,
         o_shippriority
    FROM customer,
         orders,
         lineitem
   WHERE c_mktsegment = 'BUILDING'
     and c_custkey = o_custkey
     and l_orderkey = o_orderkey
     and o_orderdate < date '1995-03-15'
     and l_shipdate > date '1995-03-15'
   GROUP BY l_orderkey,
            o_orderdate,
            o_shippriority
   ORDER BY revenue desc,
            o_orderdate)
  WHERE rownum <= 10
```

TABLE 2

TPC-H Q10

```
SELECT   /*Q10*/
  FROM (
  SELECT c_custkey,
         c_name,
         sum (l_extendedprice * (1 − l_discount)) as revenue,
         c_acctbal,
         n_name,
         c_address,
         c_phone,
         c_comment
    FROM customer,
         orders,
         lineitem,
         nation
   WHERE c_custkey = o_custkey
     and l_orderkey = o_orderkey
     and o_orderdate >= date '1993-10-01'
     and o_orderdate < date '1993-10-01' + interval '3' month
     and l_returnflag = 'R'
     and c_nationkey = n_nationkey
   GROUP BY c_custkey,
            c_name,
            c_acctbal,
            c_phone,
            n_name,
            c_address,
            c_comment
   ORDER BY revenue desc)
  WHERE rownum <= 20
```

TABLE 3

TPC-H Q18

```
SELECT   /*Q18*/
  FROM (
  SELECT c_name,
         c_custkey,
         o_orderkey,
         o_orderdate,
         o_totalprice,
         sum (l_quantity)
    FROM customer,
         orders,
         lineitem
   WHERE o_orderkey in (
         SELECT l_orderkey
           FROM lineitem
          GROUP BY l_orderkey having sum (l_quantity) > 300)
     and c_custkey = o_custkey
     and o_orderkey = l_orderkey
   GROUP BY c_name,
            c_custkey,
            o_orderkey,
            o_orderdate,
            o_totalprice
   ORDER BY o_totalprice desc,
            o_orderdate)
  WHERE rownum <= 100
```

TABLE 4

ROWID Elimination Rewrite version of TPC-H Q20

```
SELECT   /*Q20*/ "VM_NWVW_3"."$VM_COL_3" "S_NAME",
         "VM_NWVW_3"."$VM_COL_2" "S_ADDRESS"
  FROM SELECT DISTINCT "SUPPLIER"."S_NAME"
         "$VM_COL_3",
                       "SUPPLIER"."S_SUPPKEY"
                       "S_SUPPKEY",
                       "NATION"."N_NATIONKEY"
                       "N_NATIONKEY",
```

TABLE 4-continued

ROWID Elimination Rewrite version of TPC-H Q20

|  | |
|---|---|
| | "PARTSUPP"."PS_SUPPKEY" "$VM_COL_1", "SUPPLIER"."S_ADDRESS" "$VM_COL_2" |
| FROM | "TPCH"."LINEITEM" "LINEITEM", "TPCH"."PART" "PART", "TPCH"."PARTSUPP" "PARTSUPP", "TPCH"."SUPPLIER" "SUPPLIER", "TPCH"."NATION" "NATION" |
| WHERE | "SUPPLIER"."S_SUPPKEY" = "PARTSUPP"."PS_SUPPKEY" AND "SUPPLIER"."S_NATIONKEY" = "NATION"."N_NATIONKEY" AND "NATION"."N_NAME" = 'CANADA' AND "LINEITEM"."L_PARTKEY" = "PARTSUPP"."PS_PARTKEY" AND "LINEITEM"."L_SUPPKEY" = "PARTSUPP"."PS_SUPPKEY" AND "PARTSUPP"."PS_PARTKEY" = "PART"."P_PARTKEY" AND "PART"."P_NAME" LIKE 'forest%' AND "LINEITEM"."L_SHIPDATE" >= To_date ('_1994-01-01_00:00:00', 'syyyy-mm-dd_hh24:mi:ss') |

AND "LINEITEM"."L_SHIPDATE" <
 To_date('_1995-01-01_00:00:00',
 'syyyy-mm-dd_hh24:mi:ss')
AND To_date('_1995-01-01_00:00:00',
 'syyyy-mm-dd_hh24:mi:ss')
 To_date('_1994-01-01_00:00:00',
 'syyyy-mm-dd_hh24:mi:ss')
GROUP BY "SUPPLIER"."S_NAME",
 "LINEITEM"."L_SUPPKEY",
 "PARTSUPP"."PS_PARTKEY",
 "PART"."P_PARTKEY",
 "PARTSUPP"."PS_AVAILQTY",
 "PARTSUPP"."PS_SUPPKEY",
 "NATION"."N_NATIONKEY",
 "SUPPLIER"."S_SUPPKEY",
 "LINEITEM"."L_PARTKEY",
 "SUPPLIER"."S_ADDRESS"
HAVING "PARTSUPP"."PS_AVAILQTY" >
 0.5 * SUM( LINEITEM"."L_QUANTITY"))
 "VM_NWVW_3"
ORDER BY "VM_NWVW_3"."$VM_COL_3"

TABLE 5

ROWID Elimination Rewrite version of TPC-H Q21

SELECT  /*Q21*/ "FROM$_SUBQUERY$_001"."S_NAME" "S_NAME",
       "FROM$_SUBQUERY$_001"."NUMWAIT" "NUMWAIT"
FROM (SELECT "VM_NWVW_2"."$VM_COL_1" "S_NAME",
             Count (*) "NUMWAIT"
      FROM (SELECT "SUPPLIER"."S_NAME" "$VM_COL_1"
            FROM    "TPCH"."LINEITEM" "L3",
                    "TPCH"."SUPPLIER" "SUPPLIER",
                    "TPCH"."LINEITEM" "L1",
                    "TPCH"."ORDERS" "ORDERS",
                    "TPCH"."NATION" "NATION"
            WHERE "SUPPLIER"."S_SUPPKEY" = "L1"."L_SUPPKEY"
                    AND "ORDERS"."O_ORDERKEY" = "L1"."L_ORDERKEY"
                    AND "ORDERS"."O_ORDERSTATUS" = 'F'
                    AND "L1"."L_RECEIPTDATE" > "L1"."L_COMMITDATE"
                    AND 0 < 1
                    AND "SUPPLIER"."S_NATIONKEY" =
                    "NATION"."N_NATIONKEY"
                    AND "NATION"."N_NAME" = 'SAUDI_ARABIA'
                    AND "L3"."L_ORDERKEY" = "L1"."L_ORDERKEY"
                    AND "L3"."L_SUPPKEY" <> "L1"."L_SUPPKEY"
      GROUP BY    "L1"."L_ORDERKEY",
                  "L1"."L_LINENUMBER",
                  "ORDERS"."O_ORDERKEY",
                  "SUPPLIER"."S_SUPPKEY",
                  "SUPPLIER"."S_NAME"
      HAVING SUM (CASE
                  WHEN "L3"."L_RECEIPTDATE" >
                  "L3"."L_COMMITDATE"
                  THEN 1
                  ELSE 0
                  END) = 0) "VM_NWVW_2"
      GROUP BY "VM_NWVW_2"."$VM_COL_1"
      ORDER BY COUNT(*) DESC,
              "VM_NWVW_2"."$VM_COL_1")
              "FROM$_SUBQUERY$_001"
    WHERE ROWNUM <= 100;

TABLE 6

TPC-H Q20

```
SELECT  /*Q20*/ S_NAME,
        S_ADDRESS
FROM SUPPLIER,
     NATION
WHERE S_SUPPKEY IN (
      SELECT PS_SUPPKEY
      FROM   PARTSUPP
      WHERE PS_PARTKEY IN (SELECT P_PARTKEY
            FROM PART
            WHERE P_NAME LIKE 'forest%')
            AND PS_AVAILQTY > (
                SELECT 0.5 * SUM (L_QUANTITY)
                FROM LINEITEM
                WHERE L_PARTKEY
                      = PS_PARTKEY
                      AND L_SUPPKEY =
                          PS_SUPPKEY
                      AND L_SHIPDATE >=
                          DATE '1994-01-01'
                      AND L_SHIPDATE <
                          DATE '1994-01-01' +
                          INTERVAL '1' YEAR))
      AND S_NATIONKEY = N_NATIONKEY
      AND N_NAME = 'CANADA'
ORDER BY S_NAME
```

TABLE 7

TPC-H Q21

```
SELECT  /*Q21*/
FROM    (SELECT S_NAME,
                Count (*) AS numwait
         FROM   SUPPLIER,
                LINEITEM L1,
                ORDERS,
                NATION
         WHERE  S_SUPPKEY = L1.L_SUPPKEY
                AND O_ORDERKEY = L1.L_ORDERKEY
                AND O_ORDERSTATUS = 'F'
                AND L1.L_RECEIPTDATE >
                    L1.L_COMMITDATE
                AND EXISTS (SELECT *
                    FROM    LINEITEM L2
                    WHERE   L2.L_ORDERKEY =
                            L1.L_ORDERKEY
                            AND L2.L_SUPPKEY <>
                            L1.L_SUPPKEY)
                AND NOT EXISTS (SELECT *
                                FROM LINEITEM L3
                    WHERE
        L3.L_ORDERKEY = L1.L_ORDERKEY
                                AND
                                L3.L_SUPPKEY <>
                                L1.L_SUPPKEY
                                AND
                                L3.L_RECEIPTDATE >
                                L3.L_COMMITDATE)
                AND S_NATIONKEY = N_NATIONKEY
                AND N_NAME = 'SAUDIA_ARABIA'
         GROUP  BY S_NAME
         ORDER  BY NUMWAIT DESC,
                   S_NAME)
WHERE ROWNUM <= 100;
```

The ROWID Elimination Rewrite versions of TPC-H Q20 and TPC-H Q21 shown in Tables 4 and 5 are rewritten from the original queries shown in Tables 6 and 7, respectively. The rewritten versions of the queries do not contain subqueries and do not reference ROWIDs. A ROWID is a pseudo column that uniquely identifies a row in a database. ROWID Elimination Rewrite is discussed in co-pending U.S. patent application Ser. No. 16/699,524, filed Nov. 29, 2019, entitled "ROWID Elimination Rewrite," wherein the entire contents of which are hereby incorporated by reference as if fully set forth herein.

The queries shown in Tables 4 and 6 are semantically equivalent as they both produce equivalent result sets. Likewise, the queries shown in Tables 5 and 7 are semantically equivalent as they both produce equivalent result sets.

Figure 1:
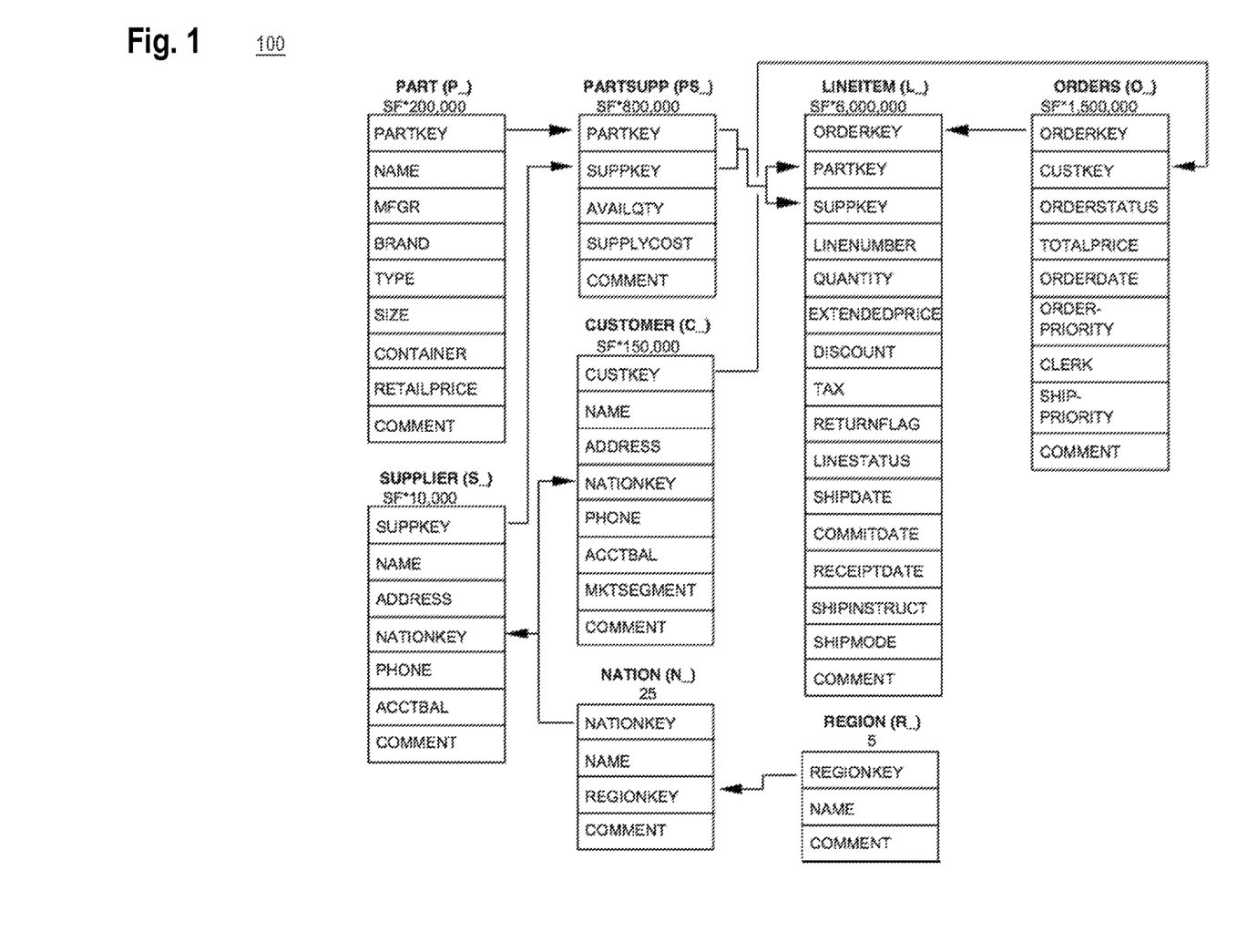
FIG. 1 illustrates an overview of a relational schema of the TPC-H Benchmark tables.

FIG. 1 illustrates an overview 100 of a relational schema of the TPC-H Benchmark tables. Based on primary key foreign key relationships in the TPC-H schema, functional dependencies between grouping columns for the queries are as follows.

TPC-H Q3: {l_orderkey}→{o_shippriority, o_orderdate}
TPC-H Q10: {c_custkey}→{c_comment, c_address, n_name, c_phone, c_acctbal, c_name}
TPC-H Q18: {c_custkey}→{c_name}, and {o_orderkey}→{o_orderdate, o_totalprice}
ROWID Elimination Rewrite version of TPC-H Q20: {s_suppkey}→{s_address, s_name}
ROWID Elimination Rewrite version of TPC-H Q21: {s_suppkey}→{s_name}

Observations of Functional Dependent Grouping Columns

As described above, each of TPC-H Q3, TPC-H Q10, TPC-H Q18, TPC-H Q20, and TPC-H Q21 references grouping columns that exhibit or have a functional dependency relationship.

Functional dependencies between grouping columns imply that there are additional columns in a grouping operation (e.g., GROUP BY operation) that do not have other effect on the grouping operation. This is because it is the left-side or the head of a FD that determines the grouping characteristics. Attributes of the right-side or the body of the FD do not cause further groupings.

Figure 2:
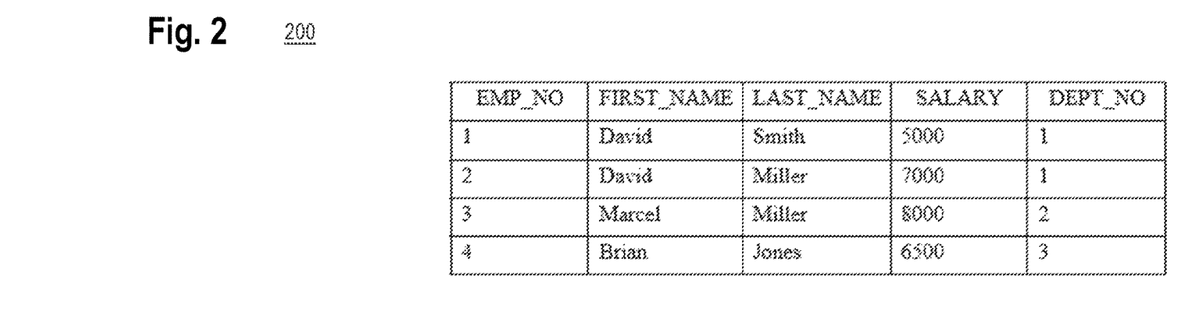
FIG. 2 illustrates an example Employee Table.

For example, referring to the Employee Table 200 illustrated in FIG. 2, the primary key is EMP_NO. Based on the primary key constraint, the FD is {EMP_NO}→{FIRST_NAME, LAST_NAME, SALARY, DEPT_NO}.

A GROUP BY operation including the EMP_NO column would result in the same number of groups, which means that the additional grouping columns (e.g., FIRST_NAME, LAST_NAME, SALARY, DEPT_NO columns) have no effect on the number of groupings. An implicit consequence of the FD is that the EMP_NO column is solely the deciding factor. Since the additional grouping columns have no effect on the grouping operation, these additional grouping columns could be disregarded or excluded from the grouping operation. These additional grouping columns that have no effect on the grouping operation are referred to as dependent grouping columns. A modified grouping algorithm could perform more efficiently if it excludes dependent grouping columns from hashing and key matching which, in turn, would reduce CPU cost and memory footprint of such modified grouping algorithm when compared to its unmodified version. However, if these dependent grouping columns are projected, they would need to be passed through the grouping operator and propagated through a corresponding QEP. In other words, even though these dependent grouping columns are excluded from hashing and key matching, they need to be made as payload columns. A payload column is a column that is, with respect to an operator, an input and output of the operator but whose values do not affect computation of rows returned by the operator.

It is contemplated that, alternatively, the GROUP BY operator may be altered or modified to include handling of grouping columns that exhibit or have a functional dependency relationship. However, an altered or modified GROUP BY operator may have negative performance effects for normal GROUP BY operations.

Accordingly, rather than altering or modifying a rather complex GROUP BY operator, by leveraging the above-described observations, a query rewrite may be employed that transforms grouping columns into aggregation columns by making use of non-blocking aggregation functions. A non-blocking aggregation function, that has no or negligible overhead, may be used. As a result, dependent grouping columns are transformed into aggregation columns, relieving the grouping operation from unnecessary processing overhead of hash computations, key matching, and increased hash collision resolution. This query rewrite is referred to as Dependent Grouping Column Rewrite.

Dependent Grouping Columns and Feasibility

As discussed above, a dependent grouping column is a column that does not change the characteristics of a grouping operation. If the dependent grouping column is removed from the grouping operation, then the same number of groups would be yielded by the grouping operation as if it had not been removed.

In an embodiment, dependent grouping columns may be identified using functional dependency. Formally, functional dependencies are defined over attributes; however, since there is a 1-to-1 mapping between columns and attributes, the terms are interchangeably used herein.

A set of dependent grouping columns $GC_{set}$ for a given grouping operation may thus be defined as $GC_{set}=\{c|\exists FD: FD\_Head \rightarrow FD\_Body \wedge FD \in FD_{set} \wedge FD\_Head \cap G \neq \emptyset \wedge c \in FD\_Body \cap G\}$, where FD denotes a mapping between FD_Head and FD_Body (e.g., FD_Head→FD_Body), where both FD_Head and FD_Body are sets of columns referenced in a query, $FD_{set}$ denotes the transitive closure of all possible functional dependencies for a GROUP BY operator, and set G denotes the set of grouping columns of the GROUP BY operator.

Put differently, a column c is considered a dependent grouping column if it is part of the body of a functional dependency FD for a GROUP BY operation where all columns of the FD's head are also grouping columns.

For example, Table 8 shows an SQL query against the Employee Table 200 of FIG. 2. Since EMP_NO is the primary key, the FD is {EMP_NO}→{LAST_NAME}. LAST_NAME is thus considered a dependent grouping column for the GROUP BY operation.

TABLE 8

Example Query against Employee Table

SELECT EMP_NO, LAST_NAME, AVG(SALARY)
FROM EMPLOYEE
GROUP BY EMP_NO, LAST_NAME

Figure 3:
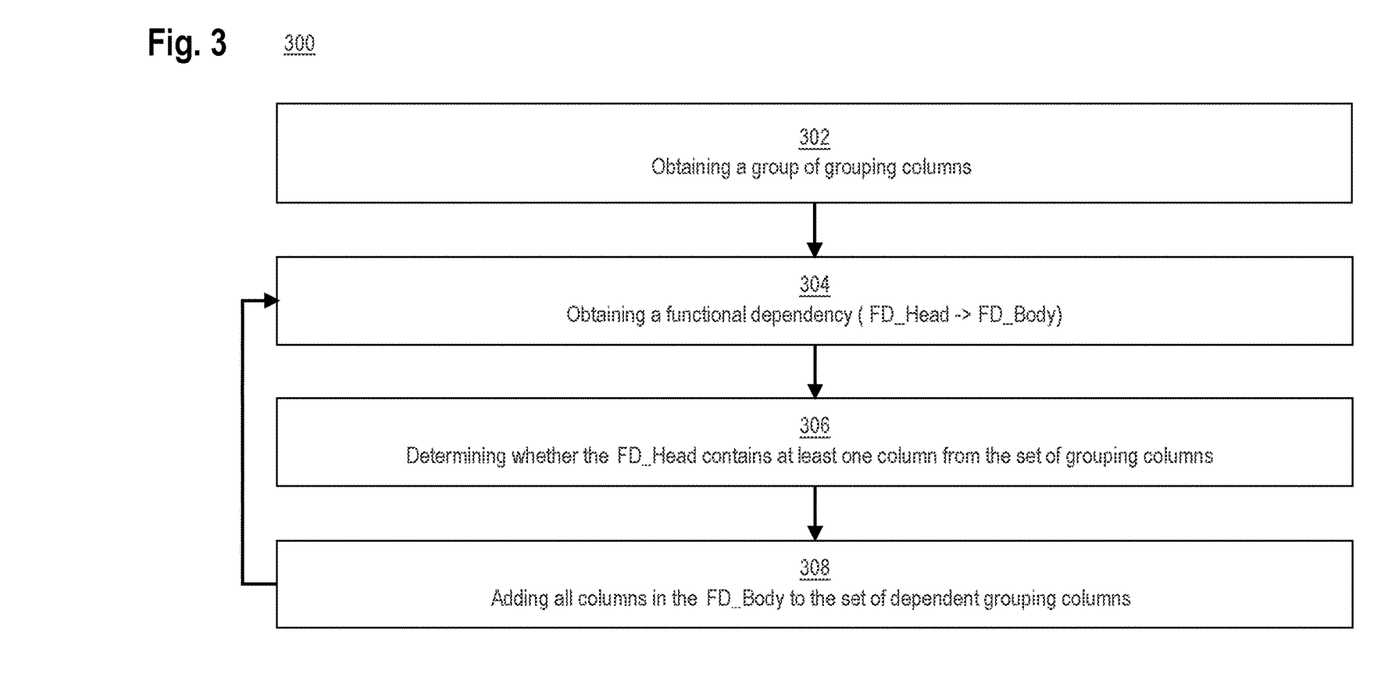
FIG. 3 illustrates a method of determining a set of dependent grouping columns according to an embodiment.

FIG. 3 illustrates a method 300 of determining a set of dependent grouping columns according to an embodiment. At block 302, a set of grouping columns is obtained. The set of grouping columns includes all columns referenced in a GROUP BY operator of a query.

At block 304, a functional dependency FD is obtained. The functional dependency is bound to a set of functional dependencies for a base table that the query will run against. The functional dependency is a relationship that exists when one or more columns of the table uniquely determine one or more other columns of the table (e.g., FD_Head→FD_Body). Both FD_Head and FD_Body are sets of one or more columns.

At block 306, it is determined whether the FD_Head of the functional dependency FD contains at least one column from the set of grouping columns.

At block 308, in response to determining that the FD_Head contains at least one column from the set of grouping columns, all columns in the FD_Body are added to the set of dependent grouping columns.

Blocks 304-308 are repeated for each of the other functional dependencies in the set of dependent grouping columns. When all of the functional dependencies have been analyzed as described, the set of dependent grouping columns would include all dependent grouping columns that have no effect on the grouping operation.

The Dependent Grouping Column Rewrite is feasible for a given dependent grouping column. However, in some embodiments, the Dependent Grouping Column Rewrite may be most efficiently applied for the entire set of dependent grouping columns.

Non-Blocking Aggregation Functions

Aggregation functions may be divided into two groups: non-block aggregation functions and blocking aggregation functions. Non-blocking aggregation functions are functions where a group's aggregation value can be computed without the knowledge of all input values of all of the group's tuples. Blocking aggregation functions are functions that need to process all tuples of a group before the aggregation value can be determined.

Example blocking aggregation functions are the Min (minimum), Max (maximum), Avg (average), and Stdev (standard deviation) aggregation functions. Since these functions are all deterministic, other functions of this category or group are most likely deterministic as well. Deterministic means that function results do not depend on the input order of tuples for a given grouping.

In contrast to blocking aggregation functions, non-blocking aggregation functions are in-deterministic, because their results are dependent on the input order of tuples for a given grouping. Non-blocking aggregation functions are discussed in U.S. patent application Ser. No. 15/897,375, filed Feb. 15, 2018, entitled "Code Dictionary Generation on Non-Blocking Operations," wherein the entire contents of which are hereby incorporated by reference as if fully set forth herein.

However, it is observed that application of a subclass of non-blocking aggregation functions on dependent grouping columns transforms a corresponding non-blocking aggregation functions into a deterministic function that retains its non-blocking characteristics. One example of the subclass of non-blocking aggregation function is the FIRST aggregation function, which is discussed in U.S. patent application Ser. No. 15/897,375, filed Feb. 15, 2018, entitled "Code Dictionary Generation on Non-Blocking Operations," wherein the entire contents of which are hereby incorporated by reference as if fully set forth herein. The FIRST aggregation function is configured to output the first value of the aggregation column that it encounters.

The implementation of the FIRST aggregation function exhibits virtually no execution overhead. In particular, during a GROUP BY operation, if an incoming tuple falls into a new group, the FIRST aggregation function picks its aggregation columns value as result and ignores all other column values of that grouping. The FIRST aggregation function is non-blocking, because the result of the FIRST aggregation function can be determined with the first column value of the grouping without the need of looking at other values. Thus, the computation overhead of the FIRST aggregation is negligible.

Returning to the example query, the rewritten version of the example SQL query is shown in Table 9. Since LAST_NAME is a dependent grouping column, its value for a given instance of EMP_NO remains the same, which implies FIRST(LAST_NAME) sees only one column value of LAST_NAME for a given grouping. Hence, in the context of dependent grouping columns, the FIRST aggregation function is considered to be deterministic.

TABLE 9

Rewritten Example Query against Employee Table

SELECT EMP_NO, FIRST(LAST_NAME), AVG(SALARY)
FROM EMPLOYEE
GROUP BY EMP_NO

Dependent Grouping Column Rewrite

Figure 4:
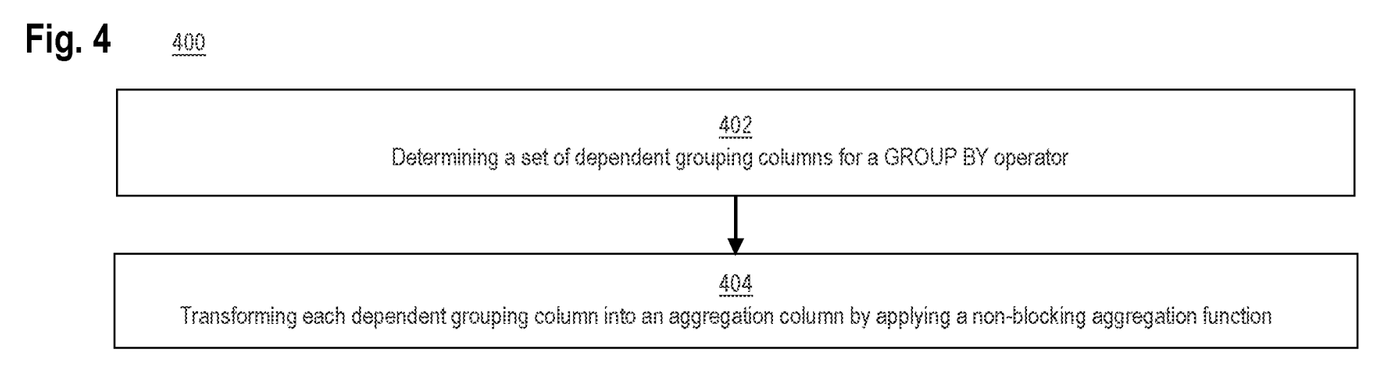
FIG. 4 illustrates a method of improving group by efficiency according to an embodiment.

In an embodiment, the Dependent Grouping Column Rewrite employs a two-step algorithm 400, illustrated in FIG. 4, that improves GROUP BY efficiency. At block 402, a set of dependent grouping columns for a GROUP BY operator is determined. Dependent grouping columns may be identified using functional dependency. A grouping column is part of the body of a functional dependency FD for the GROUP BY operation where all columns of the FD's head are also grouping columns. In an embodiment, the set of dependent grouping columns may be determined by the method 300 described above.

At block 404, each dependent grouping column determined in block 402 is transformed into an aggregation column by applying a non-blocking aggregation function. In an embodiment, the non-blocking aggregation function is a deterministic aggregation function. In an embodiment, the non-blocking aggregation function is the FIRST non-blocking aggregation function.

In an embodiment, the transformation of a corresponding dependent grouping column into an aggregation column includes removing the corresponding dependent grouping column from the group by clause associated with the GROUP BY operator. Removing the corresponding dependent grouping column from the group by clause thereby excludes that column as a grouping column.

In an embodiment, if the corresponding dependent grouping column is referenced in a select clause, then all references to the corresponding dependent grouping column are substituted by the application of the FIRST aggregation function on the corresponding dependent grouping column. It is noted that some database system implementations may not require the aggregation function to be re-specified in clauses (e.g., order by clause) other than the select clause. For example, if a column alias is used in association with a substitution by an application of the FIRST aggregation function in a select clause, then the column alias may be used in other clauses without a re-specification of the aggregation function. However, a re-specification of the aggregation function in clauses other than the select clause works for all database system implementations.

In an embodiment, if the corresponding depending grouping column is not referenced, then nothing further needs to be done.

Rewritten queries for TPC-H Q3, TPC-H Q10, TPC-H Q18, TPC-H Q20, and TPC-H Q21 are shown in Tables 10-14.

TABLE 10

Dependent Grouping Column Rewrite version of TPC-H Q3

```
SELECT   /*Q3*/
  FROM (
  SELECT l_orderkey,
         sum (l_extendedprice * (1 - l_discount)) as revenue,
         first (o_orderdate) as o_orderdate,
         first (o_shippriority) as o_shippriority
  FROM customer,
       orders,
       lineitem
  WHERE c_mktsegment = 'BUILDING'
    and c_custkey = o_custkey
    and l_orderkey = o_orderkey
    and o_orderdate < date '1995-03-15'
    and l_shipdate > date '1995-03-15'
  GROUP BY l_orderkey,
  ORDER BY revenue desc,
           first (o_orderdate))
WHERE rownum <= 10
```

TABLE 11

Dependent Grouping Column Rewrite version of TPC-H Q10

```
SELECT   /*Q10*/
  FROM (
  SELECT c_custkey,
         first (c_name) as c_name,
         sum (l_extendedprice * (1 - l_discount)) as revenue,
         first (c_acctbal) as c_acctbal,
         first (n_name) as n_name,
         first (c_address) as c_address,
         first (c_phone) as c_phone,
         first (c_comment) as c_comment
  FROM customer,
       orders,
       lineitem,
       nation
  WHERE c_custkey = o_custkey
    and l_orderkey = o_orderkey
    and o_orderdate >= date '1993-10-01'
    and o_orderdate < date '1993-10-01' + interval '3' month
    and l_returnflag = 'R'
    and c_nationkey = n_nationkey
  GROUP BY c_custkey
  ORDER BY revenue desc)
WHERE rownum <= 20
```

TABLE 12

Dependent Grouping Column Rewrite version of TPC-H Q18

```
SELECT   /*Q18*/
  FROM (
  SELECT first (c_name) as c_name,
         c_custkey,
         o_orderkey,
         first (o_orderdate) as o_orderdate,
         first (o_totalprice) as o_totalprice,
         sum (l_quantity)
  FROM customer,
       orders,
       lineitem
  WHERE o_orderkey in (
    SELECT l_orderkey
    FROM lineitem
```

TABLE 12-continued

Dependent Grouping Column Rewrite version of TPC-H Q18

```
        GROUP BY l_orderkey having sum (l_quantity) > 300)
        and c_custkey = o_custkey
        and o_orderkey = l_orderkey
    GROUP BY c_name,
        c_custkey,
    ORDER BY o_totalprice desc,
        first (o_orderdate))
    WHERE rownum <= 100
```

TABLE 13

Dependent Grouping Column Rewrite version of TPC-H Q20

```
SELECT  /*Q20*/ "VM_NWVW_3"."$VM_COL_3" "S_NAME",
    "VM_NWVW_3"."$VM_COL_2" "S_ADDRESS"
FROM (SELECT DISTINCT FIRST("SUPPLIER"."S_NAME")
"$VM_COL_3",
                "SUPPLIER"."S_SUPPKEY" "S_SUPPKEY",
                "NATION"."N_NATIONKEY"
                "N_NATIONKEY",
                "PARTSUPP"."PS_SUPPKEY"
                "$VM_COL_1",
                FIRST("SUPPLIER"."S_ADDRESS")
                "$VM_COL_2"
    FROM        "TPCH"."LINEITEM" "LINEITEM",
                "TPCH"."PART" "PART",
                "TPCH"."PARTSUPP" "PARTSUPP",
                "TPCH"."SUPPLIER" "SUPPLIER",
                "TPCH"."NATION" "NATION"
    WHERE       "SUPPLIER"."S_SUPPKEY" =
                "PARTSUPP"."PS_SUPPKEY"
        AND "SUPPLIER"."S_NATIONKEY" =
        "NATION"."N_NATIONKEY"
        AND "NATION"."N_NAME" = 'CANADA'
        AND "LINEITEM"."L_PARTKEY" =
        "PARTSUPP"."PS_PARTKEY"
        AND "LINEITEM"."L_SUPPKEY" =
        "PARTSUPP"."PS_SUPPKEY"
        AND "PARTSUPP"."PS_PARTKEY" =
        "PART"."P_PARTKEY"
        AND "PART"."P_NAME" LIKE 'forest%'
        AND "LINEITEM"."L_SHIPDATE" >=
            To_date ('_1994-01-01_00:00:00', 'syyyy-mm-
            dd_hh24:mi:ss')
        AND "LINEITEM"."L_SHIPDATE" <
            To_date('_1995-01-01_00:00:00', 'syyyy-mm-
            dd_hh24:mi:ss')
        AND To_date('_1995-01-01_00:00:00', 'syyyy-mm-
            dd_hh24:mi:ss')
            To_date('_1994-01-01_00:00:00', 'syyyy-mm-
            dd_hh24:mi:ss')
    GROUP BY "LINEITEM"."L_SUPPKEY",
            "PARTSUPP"."PS_PARTKEY",
            "PART"."P_PARTKEY",
            "PARTSUPP"."PS_AVAILQTY",
            "PARTSUPP"."PS_SUPPKEY",
            "NATION"."N_NATIONKEY",
            "SUPPLIER"."S_SUPPKEY",
            "LINEITEM"."L_PARTKEY",
    HAVING "PARTSUPP"."PS_AVAILQTY" >
        0.5 * SUM( LINEITEM"."L_QUANTITY"))
    "VM_NWVW_3"
ORDER BY "VM_NWVW_3"."$VM_COL_3"
```

TABLE 14

Dependent Grouping Column Rewrite version of TPC-H Q21

```
SELECT  /*Q21*/ "FROM$_SUBQUERY$_001"."S_NAME"
"S_NAME",
    "FROM$_SUBQUERY$_001"."NUMWAIT" "NUMWAIT"
FROM (SELECT "VM_NWVW_2"."$VM_COL_1" "S_NAME",
        Count (*) "NUMWAIT"
```

TABLE 14-continued

Dependent Grouping Column Rewrite version of TPC-H Q21

```
    FROM (SELECT FIRST("SUPPLIER"."S_NAME")
    "$VM_COL_1"
        FROM        "TPCH"."LINEITEM" "L3",
                    "TPCH"."SUPPLIER"
                    "SUPPLIER",
                    "TPCH"."LINEITEM" "L1",
                    "TPCH"."ORDERS"
                    "ORDERS",
                    "TPCH"."NATION"
                    "NATION"
        WHERE "SUPPLIER"."S_SUPPKEY" =
        "L1"."L_SUPPKEY"
            AND "ORDERS"."O_ORDERKEY" =
            "L1"."L_ORDERKEY"
            AND "ORDERS"."O_ORDERSTATUS" = 'F'
            AND "L1"."L_RECEIPTDATE" >
            "L1"."L_COMMITDATE"
            AND 0 < 1
            AND "SUPPLIER"."S_NATIONKEY" =
            "NATION"."N_NATIONKEY"
            AND "NATION"."N_NAME" =
            'SAUDI_ARABIA'
            AND "L3"."L_ORDERKEY" =
            "L1"."L_ORDERKEY"
            AND "L3"."L_SUPPKEY" <>
            "L1"."L_SUPPKEY"
        GROUP BY    "L1"."L_ORDERKEY",
                    "L1"."L_LINENUMBER",
                    "ORDERS"."O_ORDERKEY",
                    "SUPPLIER"."S_SUPPKEY"
        HAVING SUM (CASE
                    WHEN_"L3"."L_RECEIPTDATE" >
                    "L3"."L_COMMITDATE"
                THEN 1
                ELSE 0
                END) = 0) "VM_NWVW_2"
        GROUP BY "VM_NWVW_2"."$VM_COL_1"
        ORDER BY COUNT(*) DESC,
            "VM_NWVW_2"."$VM_COL_1")
            "FROM$_SUBQUERY$_001"
WHERE ROWNUM <= 100;
```

By excluding dependent grouping columns from group by clauses, the grouping operations are simplified, as demonstrated in the written versions of the queries shown in Tables 11-14. The simplified grouping operation reduces memory pressure, speeds up grouping operations, and saves compute time, as grouping columns that have no additional effect on grouping operations are excluded from processing (e.g., hashing and key matching).

Query Optimizer Integration

There are several strategies for integrating the rewrite technique into a cost-based optimizer.

One strategy is to add the rewrite technique just as another rewrite rule. For example, Transformation-Based Query Optimizers, like Columbia or Cascades, can be extended to integrate the Dependent Grouping Column Rewrite. The Dependent Grouping Column Rewrite may be added as a heuristic rather than a cost base alternative.

There are two strategies to apply the Dependent Grouping Column Rewrite in a generative query optimizer. A first possibility is, as part of the Query Rewrite Phase I, cost-based optimization may not be needed as the Dependent Grouping Column Rewrite performs better than its alternative. A second possibility is to integrate the Dependent Grouping Column Rewrite into Query Rewrite Phase II. That is, once a QEP is formed, dependent grouping columns can be substituted.

Dependent Grouping Column Rewrite Flow Example

Figure 5:
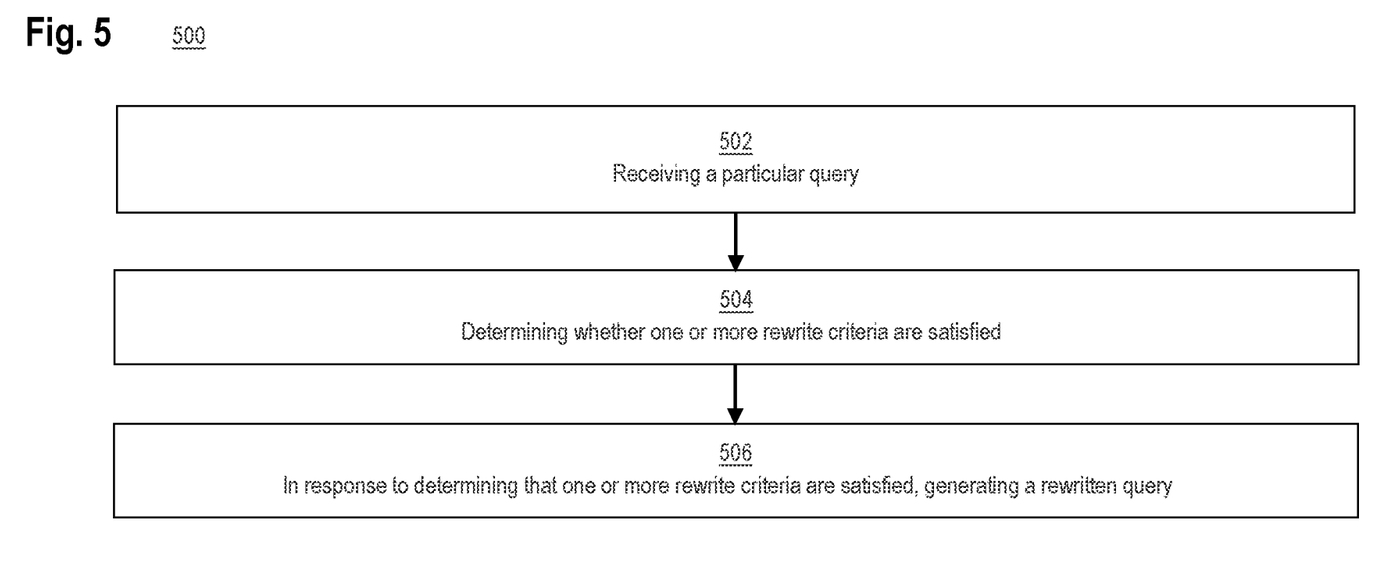
FIG. 5 illustrates a block diagram depicting a Dependent Grouping Column Rewrite technique according to an embodiment.

FIG. 5 illustrates a block diagram depicting a Dependent Grouping Column Rewrite technique according to an embodiment. At block 502, a DBMS (or, more particularly, an optimizer or rewrite component of the DBMS) receives a particular query. The particular query references a set of grouping columns. In an embodiment, the set of grouping columns is referenced in a grouping clause in the particular query.

At block 504, during DBMS compilation and/or query optimization of a particular query, the DBMS determines whether one or more rewrite criteria are satisfied.

In an embodiment, a rewrite criterion may be that the set of grouping columns includes a set of one or more dependent grouping columns. Each dependent grouping column from the set of one or more dependent grouping columns is functionally dependent one or more grouping columns from the set of grouping columns. In an embodiment, the one or more grouping columns from the set of grouping columns are not part of the set of dependent grouping columns.

At block 506, in response to determining that one or more rewrite criteria are satisfied, a rewritten query is generated. The rewritten query excludes the set of one or more dependent columns as grouping columns. For each column of the set of one or more dependent grouping columns, an aggregation function is projected and applied to a respective column.

In an embodiment, the non-blocking aggregation function is deterministic. An example of a nonblocking but deterministic aggregation function is the FIRST non-blocking aggregation function.

In an embodiment, the aggregation function is included in a select clause in the rewritten query. The aggregate function included in the select clause thereby projects the aggregation function that is applied to the respective column.

In an embodiment, the aggregation function is also included in an ordering clause in the rewritten query. The aggregate function included in the ordering clause thereby projects the aggregation function that is applied to the respective column.

In an embodiment, the set of one or more dependent grouping columns is removed from a grouping clause in the rewritten query. The set of one or more dependent grouping columns removed from the grouping clause excludes the set of one or more dependent grouping columns as grouping columns.

The rewritten query and the particular query are semantically equivalent. The rewritten query that excludes the dependent grouping columns from the grouping clause, simplifies the grouping operation since these grouping columns that have no additional effect on the grouping operation are not part of the grouping clause. Removal of the dependent grouping column from the grouping clause thereby reduces memory pressure, speeds up grouping operations, and saves compute time.

The rewrite technique described herein are applied to text queries. However, it is noted that there are other forms of query representation, other than text, that may be manipulated, in effect, to exclude one or more dependent grouping columns and/or to project one or more columns and/or one or more functions.

Database Overview

Embodiments of the present invention are used in the context of database management systems (DBMSs). Therefore, a description of an example DBMS is provided.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g., to store rows of a table, to store column values of a column). When records are read from persistent storage, a database block containing the record is copied into a database block buffer in volatile memory of a database server. A database block usually contains multiple rows, and control and formatting information, (e.g., offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

A data block may be associated with a data block address that uniquely identifies the data block and the data block's storage location within a storage device. A database server may request from a storage device a data block by data block address, or even by primary block address ranges of data blocks.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Optimization and Execution Plans

When a database server receives the original statement of a database command, the database server must first determine which actions should be performed to execute the database command, and then perform those actions. The act of preparing for performance of those actions is generally referred to as "compiling" the database command, while performing those actions is generally referred to as "executing" the database command. During the compilation of a query statement, the database server may perform a significant amount of preliminary work for the statement, such as parsing, semantic analysis, and execution plan generation.

A database command submitted to a database server goes through a query compilation phase where the database command is parsed and optimized. Query optimization selects an optimal execution plan which is then passed on to a query execution engine as a query execution plan to be executed during runtime.

Query optimization generates one or more different candidate execution plans for a database command, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a database command by transforming the database command. In general, transforming a data command involves rewriting a database command into another semantically equivalent database command that should produce the equivalent result and that can potentially be executed more efficiently, i.e. one for which a potentially more efficient and less costly execution plan can be generated. Examples of query transformations include view merging, subquery unnesting, predicate move-around and push-down, common subexpression elimination, outer-to-inner join conversion, materialized view rewrite, and star transformation.

Hardware Overview

Figure 6:
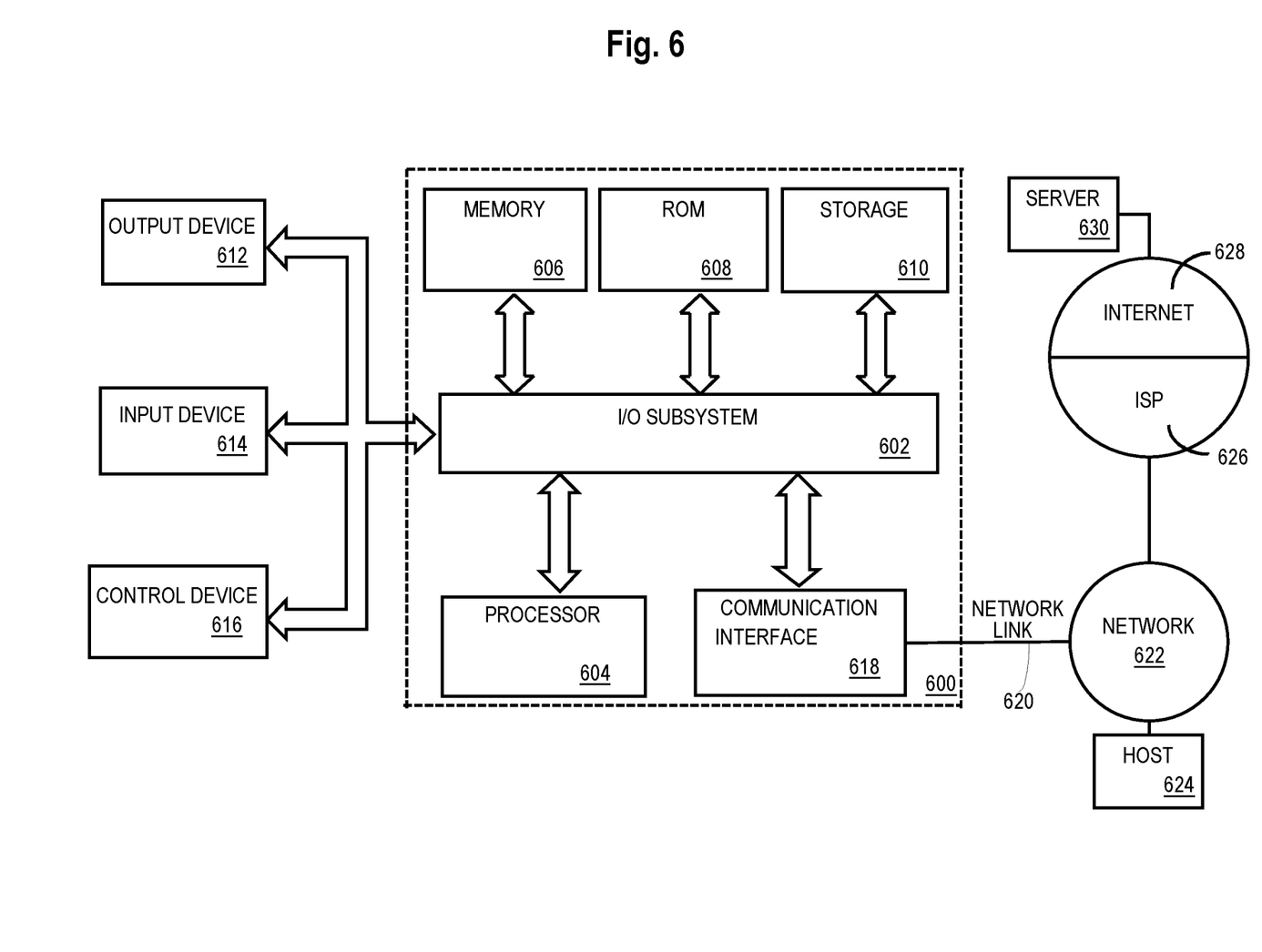
FIG. 6 illustrates a block diagram of a computing device in which the example embodiment(s) of the present invention may be embodiment.

Referring now to FIG. 6, it is a block diagram that illustrates a basic computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Software Overview

Figure 7:
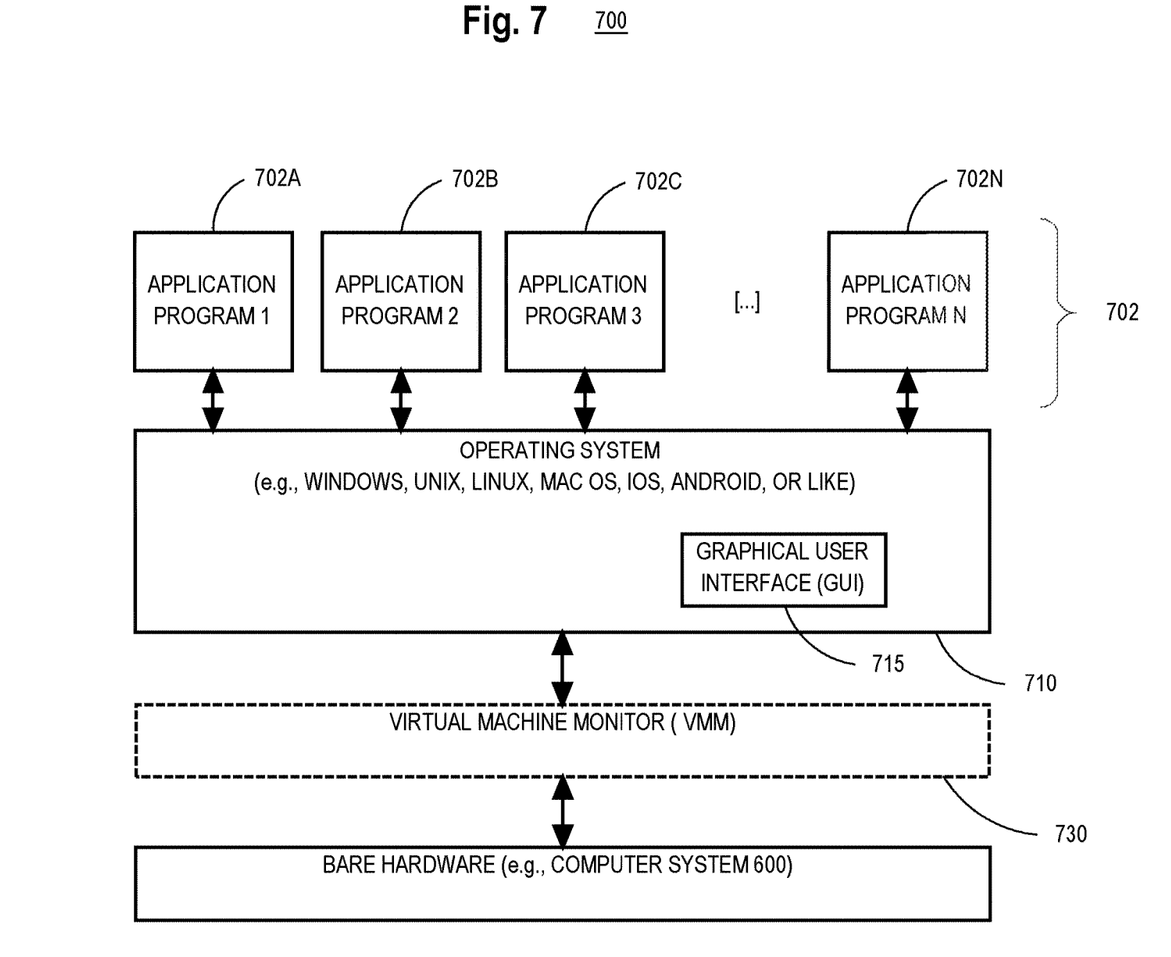
FIG. 7 illustrates a block diagram of a basic software system for controlling the operation of a computing device.

FIG. 7 is a block diagram of a basic software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
rewriting a particular query;
wherein the particular query references a set of grouping columns;
wherein rewriting the particular query comprises:
determining that rewrite criteria are satisfied, wherein the rewrite criteria includes:
the set of grouping columns includes a set of one or more dependent grouping columns and at least one grouping column that the set of one or more dependent grouping columns does not contain;
and wherein each dependent grouping column from the set of one or more dependent grouping columns is functionally dependent on one or more grouping columns from the set of grouping columns;
in response to determining that the rewrite criteria are satisfied, generating a rewritten query that:
excludes the set of one or more dependent grouping columns as grouping columns;
for each column of the set of one or more dependent grouping columns, projects an aggregation function that is applied to a respective column.

2. The method of claim 1, wherein the aggregation function is a non-blocking aggregation function.

3. The method of claim 2, wherein the non-blocking aggregation function is a deterministic function.

4. The method of claim 1, wherein generating the rewrite query comprises removing the set of one or more dependent grouping columns from a grouping clause.

5. The method of claim 1, wherein the at least one grouping column that the set of one or more dependent grouping columns does not contain includes a primary key column.

6. The method of claim 1, wherein generating the rewrite query comprises including the aggregation function in a select clause.

7. The method of claim 1, wherein the aggregation function is a FIRST aggregation function.

8. The method of claim 1, wherein generating the rewrite query comprises including the aggregation function in an ordering clause.

9. The method of claim 1, wherein:
the at least one grouping column that the set of one or more dependent grouping columns does not contain is a single column;
the set of one or more dependent grouping columns contains multiple columns.

10. One or more non-transitory computer-readable storage medium storing instructions that, when executed by one or more processors, cause the one or more processors to perform functions comprising:
rewriting a particular query;
wherein the particular query references a set of grouping columns;
wherein rewriting the particular query comprises:
determining that rewrite criteria are satisfied, wherein the rewrite criteria includes:
the set of grouping columns includes a set of one or more dependent grouping columns and at least one grouping column that the set of one or more dependent grouping columns does not contain;
and wherein each dependent grouping column from the set of one or more dependent grouping columns is functionally dependent on one or more grouping columns from the set of grouping columns;
in response to determining that the rewrite criteria are satisfied, generating a rewritten query that:
excludes the set of one or more dependent grouping columns as grouping columns;
for each column of the set of one or more dependent grouping columns, projects an aggregation function that is applied to a respective column.

11. The one or more non-transitory computer-readable storage medium of claim 10, wherein the aggregation function is a non-blocking aggregation function.

12. The one or more non-transitory computer-readable storage medium of claim 11, wherein the non-blocking aggregation function is a deterministic function.

13. The one or more non-transitory computer-readable storage medium of claim 10, wherein generating the rewrite query comprises removing the set of one or more dependent grouping columns from a grouping clause.

14. The one or more non-transitory computer-readable storage medium of claim 10, wherein the at least one grouping column that the set of one or more dependent grouping columns does not contain includes a primary key column.

15. The one or more non-transitory computer-readable storage medium of claim 10, wherein generating the rewrite query comprises including the aggregation function in a select clause.

16. The one or more non-transitory computer-readable storage medium of claim 10, wherein the aggregation function is a FIRST aggregation function.

17. The one or more non-transitory computer-readable storage medium of claim 10, wherein generating the rewrite query comprises including the aggregation function in an ordering clause.

18. The one or more non-transitory computer-readable storage medium of claim 10, wherein:
the at least one grouping column that the set of one or more dependent grouping columns does not contain is a single column;
the set of one or more dependent grouping columns contains multiple columns.

* * * * *

UNITED STATES PATENT AND TRADEMARK OFFICE
CERTIFICATE OF CORRECTION

PATENT NO. : 11,314,736 B2
APPLICATION NO. : 16/744635
DATED : April 26, 2022
INVENTOR(S) : Fender et al.

It is certified that error appears in the above-identified patent and that said Letters Patent is hereby corrected as shown below:

On the Title Page

Line 1, insert -- Improving Group-By Efficiency Through Functional Dependencies And Non-Blocking Aggregation Functions --.

On page 2, Column 2, under Other Publications, Line 5, delete "Inuential Benchmar"," and insert -- Influential Benchmark", --, therefor.

In the Specification

In Column 1, Line 1, delete "THOUGH" and insert -- THROUGH --, therefor.

In Column 2, Line 37, delete "the those" and insert -- those --, therefor.

Signed and Sealed this
Thirtieth Day of August, 2022

Katherine Kelly Vidal
*Director of the United States Patent and Trademark Office*